United States Patent
Lewin et al.

(10) Patent No.: US 6,513,010 B1
(45) Date of Patent: Jan. 28, 2003

(54) METHOD AND APPARATUS FOR SEPARATING PROCESSING FOR LANGUAGE-UNDERSTANDING FROM AN APPLICATION AND ITS FUNCTIONALITY

(75) Inventors: Erland Lewin, Stockholm (SE); Marten Stenius, Stockholm (SE); Daniel Adler, Stockholm (SE)

(73) Assignee: Voxi AB, Stockholm (SE)

( * ) Notice: Subject to any disclaimer, the term of this patent is extended or adjusted under 35 U.S.C. 154(b) by 104 days.

(21) Appl. No.: 09/580,899

(22) Filed: May 30, 2000

(51) Int. Cl.$^7$ .................. G10L 21/00; G10L 15/04; G10L 21/06; G06F 17/21

(52) U.S. Cl. ............... 704/270.1; 704/10; 704/251; 704/275

(58) Field of Search ............... 704/2, 9, 270.1, 704/270, 4, 8, 200, 255, 275, 10; 707/4, 5, 2

(56) References Cited

U.S. PATENT DOCUMENTS

| | | | | |
|---|---|---|---|---|
| 4,887,212 A | * | 12/1989 | Zamora et al. | 704/8 |
| 5,550,971 A | * | 8/1996 | Brunner et al. | 707/4 |
| 5,642,519 A | * | 6/1997 | Martin | 704/255 |
| 5,682,542 A | | 10/1997 | Enomoto et al. | 707/516 |
| 5,748,805 A | * | 5/1998 | Withgott et al. | 707/512 |
| 5,805,832 A | * | 9/1998 | Brown et al. | 704/9 |
| 5,809,499 A | * | 9/1998 | Wong et al. | 704/200 |

FOREIGN PATENT DOCUMENTS

WO WO0021074 4/2000 ........... G10L/15/18

OTHER PUBLICATIONS

VoiceAssist™ (VoiceAssist™ User Guide, Creative Technology Ltd, Jul. 1993).*
Theodorakis et al ("On Context–Based Naming in Information Bases", Cooperative Information Systems, Jun. 1997).*
1997 IEEE International Conference on Acoustics, Speech, and Signal Processing, 1997. ICASSP–97., Apr. 21–24, 1997, Stahl H. et al: "Controlling limited–domain applications by probabilistic semantic decoding of natural speech", pp. 1163–1166 vol. 2; figure 1, paragraph 5.
Interactive Voice Technology for Telecommunications Applications, 1998. IVTTA '98. Proceedings 1998 IEEE 4th workshop, Sep. 29–30, 1998, Hanrieder G. et al: "Integration of a mixed–initiative dialogue manager into commerical IVR platforms", pp. 77–82; see figure 1 and p. 79, righ hand column, paragraph C.

* cited by examiner

Primary Examiner—Richemond Dorvil
Assistant Examiner—Daniel Nolan
(74) Attorney, Agent, or Firm—Jones, Day, Reavis & Pogue

(57) ABSTRACT

The invention relates to a method and an apparatus for separating processing for language understanding from an application and its functionality. The application for example contains functionality within a provided domain, whereby the domain and its functionality belongs to a speech controlled device such as a car-radio, a car-AC, a CD-player or almost any program controlled device.

22 Claims, 1 Drawing Sheet

METHOD AND APPARATUS FOR SEPARATING PROCESSING FOR LANGUAGE-UNDERSTANDING FROM AN APPLICATION AND ITS FUNCTIONALITY

The present invention pertains to a method and an apparatus for separating processing for language-understanding from an application and its functionality, the application containing functionality within a provided domain.

TECHNICAL FIELD

The present invention pertains to a method and a system for separating processing for language-understanding from an application and its functionality, said application containing functionality within a provided domain.

BACKGROUND ART

Conventional speech recognition application programming interfaces (API:s), such as Microsoft Speech API™ and Java Speech API™, take input on the form of a grammar and a lexicon, with little other information on the context or application domain in which the language interface is to operate. The output of such API:s is typically a stream of words, and an application designer must build a substantial amount of custom code to interpret the words and make appropriate application calls.

As illustrated in FIG. 1 of the attached drawings, the conventional speech recognizer with its API is so to speak glued with custom code to the application itself The custom code provides the "intelligence" in translating a stream of words received from the speech recognizer to appropriate application calls. Any translation to actual application objects, methods, etc. has to be done on a per-case basis in the custom code.

Other speech API:s aim at reducing the amount of custom code, by allowing the use of modal dialogs. For example, the Philips SpeechMania® 99 product has been demonstrated with a pizza ordering application, where a user goes through dialog modes involving for instance selecting pizza toppings. A disadvantage of this type of technology is that the system will only understand the utterances expected in the given mode. If the user changes his drink order while the user is expected to select pizza toppings, the system may fail to understand this. The degree to which the system 'understands' the utterances in this kind of interaction is limited; each mode and the utterances valid therein must be anticipated by the developers, and directly related to the action the system takes as a response to the user input. This also means it requires a substantial amount of interface design work, with extensive studies (such as "wizard of oz"-type of settings) to determine every possible phrase a user might come up with in a given situation.

A widely distributed application of speech recognition and language-understanding today is different forms of telephony services. These systems are typically built with a central server, which accepts incoming voice calls over standard telephone lines. The users are presented with an interactive voice-based interface, and can make choices, navigate through menus, etc by uttering voice commands. The complete set of software, ranging from the speech recognition, through language-understanding, to application calls, database searches, and audio feedback, resides on the central server. This put high demands on the central server hardware and software, which also must support a large number of simultaneous interactive voice sessions. Typical applications for this type of system is ticket booking, general information services, banking systems, etc. An example of such a system is the "SJ Passenger traffic timetable information system", in use by the Swedish Railway.

Many speech- and language-enabled applications do not use speech recognizer API:s (see description above with respect to the discussion of "conventional speech recognition API:s"). Instead, they implement the whole range of technologies required, from speech recognition through syntactic and semantic (linguistic) processing to the actual application calls and effects. Such designs are called, monolithic, since they do not make use of specified API:s to distinguish between different interchangeable modules of the language interaction system, but rather put all components in "one design". An example of such a design is disclosed by, Bertenstam J. et al, "The Waxholm Application Data-Base", Proc. of Eurospeech '95, Vol. 1, pp. 833–836, Madrid, 1995. The "Waxholm system" is a speech-controlled system for search and retrieval of information on boat timetables and services in the Stockholm archipelago. The system implements all relevant linguistic components, such as speech recognition, lexicon, grammar, semantics and application functionality internally.

The field of distributed systems in general deals with the distribution of databases, object repositories, etc over computer networks, The general intent is to provide unified high-level platforms to be used by computer applications that require runtime data to be presented and distributed over a network. One effort to provide a standardized framework for the design of distributed systems is the Common Object Request Broker Architecture (CORBA), proposed by the Object Management Group (OMG), The CORBA architecture is centered around the Object Request Broker (ORB), which handles application (client) calls to a distributed object by providing object stubs (or proxies) on the client-side, on which remote procedure calls are made and transferred to the actual object implementation (server) over the network.

The present invention addresses some fundamental problems that currently arise when language-based interaction is to be performed with multiple application entities present. These can be summarized in three main issues:

1) The lack of a consistent natural language interaction model for different application entities. This means that a multitude of different applications exist with different and mutually inconsistent linguistic interfaces. The interpretation of the recognized strings of words received from the speech recognizers is done by custom code (see description above with respect to the discussion of "conventional speech recognition API:s"), or even with the complete speech recognition and linguistic processing as an integral part of the application (see description above with respect to the discussion of "monolithic applications with language-based interaction"), and thus with application-specific solutions. This means that the ways users speak to machines varies and is inconsistent.

2) The lack of transparent interaction using natural language with multiple application entities. Given multiple natural language-enabled applications, there is a lack of unifying methods to bring the language interfaces together so as to make them accessible at once by the user. Application-specific solutions to distinguish between different sub-functionalities of a system exist (such as prefixing an utterance by "telephone, . . . " or "calendar, . . . " to indicate the context of a command), but this is still limited to customized solutions of particular application designs, and the parsing and linguistic processing is still left to each particular application once the destination of an utterance is determined. Thus, there exists a lack of "unification of linguistic processing and execution ", given different accessible applications. As an example of where this type of interaction is problematic, consider a situation when a user wants to control different electronic systems integrated in a car, a stereo and a climate control system. Rather than prefixing each utterance with a destination (by saying things such as "radio, louder", or "climate, cooler"), the system should be able to resolve sentences in the context of both applications simultaneously and understand that the verb "louder" is addressed to the radio, and "cooler" is addressed to the climate control system, something that currently can only be achieved by building the two applications as one single application unit.

3) The requirement to build natural language processing into all entities. Since there are no methods of unifying the linguistic processing of disparate applications in one design (see the two previous points), the full linguistic processing must with conventional techniques be built into each application. This is generally a problem when it comes to efficient resource usage (with respect to memory and processing power, as well as to the manpower required to develop a working system). Whereas less problematic in centralized design (such as exemplified in the description above with respect to the discussion of "conventional telephony systems"), this problem becomes severe in the case of built-in systems, portable designs, etc, since such implementations are extremely sensitive to the amount of processing hardware required for 4 particular application.

SUMMARY OF THE DISCLOSED INVENTION

The present invention relates to a method and an apparatus for separating processing for language-understanding from an application and its functionality, the application containing functionality within a provided domain. It intends to solve problems relating to prior systems and specifically to provide a general means for controlling application means, such as a radio, air condition system, etc. and other electrically controlled appliances, and software applications on a computer.

In order to achieve the aims of the present invention it sets forth a method of organizing linguistic data describing linguistic interaction with an application specific linguistic logic and a general linguistic understanding logic. The method includes the steps of separating the application logic from the general logic, the application logic containing functionality with a predetermined application domain, wherein the functionality being provided is through a data model, reflecting the functionality to the general logic through use in linguistic interaction by providing that the application exports information about words and senses to the general logic and provides a distributed consistent linguistic interaction model for different applications using the same general logic to interpret applications with different functionality.

In another embodiment information about words comprises objects, attributes, and classes from the object oriented model.

A further embodiment finds that the objects are nouns, the attributes are adjectives and the classes are verbs.

A still further embodiment sets forth that grammars are provided by the application for specific unusual expressions.

Another embodiment of the present invention provides that the general linguistic understanding logic belongs to speech-recognition.

Yet another embodiment provides that the general linguistic understanding logic belongs to text.

In yet another embodiment standard grammar for utterances and phrases in various languages, which are independent Of the domain, are built into the general language-understanding linguistic logic.

A further embodiment encompasses that closed word classes and some very common words in each known language are built into the general language-understanding linguistic logic.

Further, one embodiment provides that a transfer of words is considered as a two-step process including an establishment of an on-demand connection or presence to determine the need of transfer of the application structure to the general linguistic-understanding logic and the provision of application-specific linguistic data from the application to the general linguistic-understanding logic.

Another embodiment of the invention comprises that the second step is accomplished by direct transfer, or by providing access through a distributed object system.

A still further embodiment provides that a wireless network is used as an interface between the general logic and the application specific logic. In one embodiment the wireless network is operating in accordance with the Bluetooth standard.

The present invention also sets forth a system of organizing linguistic data describing linguistic interaction with an application means for specific linguistic logic and a general linguistic understanding logic engine means containing an application independent grammar description including means for separating the means for specific logic from the engine means, the specific logic means containing functionality within a predetermine application domain, the functionality being provided through a data model, and means for reflecting the functionality to the logic engine for use in linguistic interaction by providing that the specific logic means exports information about words and senses to the engine means and means for providing a distributed consistent linguistic interaction for different application using the same general logic engine means to interpret applications with different functionality.

The system according to the present invention is also able to set forth the above method embodiments as disclosed in the attached dependent system claims.

BRIEF DESCRIPTION OF THE DRAWINGS

The invention is now described in more detail in the form of non-limiting embodiments according to the present invention, clarified with the help of the enclosed drawings, where.

DETAILED DESCRIPTION OF PREFERRED EMBODIMENTS

Figure 1:
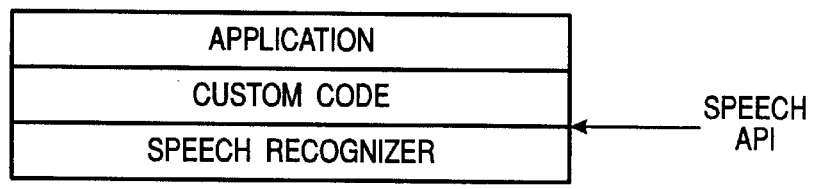
FIG. 1 schematically illustrates conventional speech recognition API:s according to the background art.

The present invention provides a method and a system for separating processing for language-understanding from an application and its functionality. This results in a linguistic application programming interface (API) and runtime communication protocol design that allows an application developer to provide natural language interaction, independent of the separation of the interaction logic and the application logic. Examples of such configurations are:

- Separation by a conventional computer network. Such as: A mail-reading application residing on a stationary computer, connected via a computer network to a generic language-understanding engine.
- Integrated equipment. Such as: An integrated music player device, combining the music playing application with the speech interaction logic in one device.
- Separation by a wireless communications channel. Such as: An automobile control system for air conditioning, Hi-Fi equipment etc in the car is connected via a wireless computer network to a generic portable device with basic linguistic capabilities.
- Units present on a dynamically changing network. Such as: An ad-hoc connection established between a personal digital assistant (PDA) and a portable device with speech and language-understanding, using a dynamic wireless network protocol (see for example "Specification of the Bluetooth System—v 1.0B", Bluetooth Special Interest Group, Dec. 1, 1999).

The key feature of the invention that makes this possible is the distinction between application-specific logic and general linguistic logic and the separation of these into different system modules. This is described here below with respect to "distinction between application-specific and general linguistic logic." This is what enables a unified API that can be used in a wide range of settings, such as previously exemplified. Herein below (with respect to "design consequences") some consequences of this design are described, and below is also exemplified the use by describing the implementation of a music player controllable through natural language interaction. U.S. patent application Ser. No. 09/551,997 filed Apr. 19, 2000, entitled CONVERSION BETWEEN DATA REPRESENTATION FORMATS, by inventor Lewin, assigned to the assignee here, Voxi AB, is hereby incorporated herein in its entirety by reference.

The present invention specifies a manner of organizing linguistic data describing possible linguistic interaction with an application, such that the application may be separate from the language-understanding, and possibly speech recognition aspects. Hence, a distinction between application-specific and general linguistic logic.

The application contains functionality within some given domain (for example an email application, a music player, or a word processor). This functionality can be reflected for use in linguistic interaction by letting the application export words, senses, objects, optional grammars, and optional speech models as detailed below. The object model itself is language-independent, whereas words, senses, grammars, and speech models are language-specific, and by switching these multiple languages can be supported.

The exported words represent objects (nouns), attributes (adjectives), functions (verbs) and possibly other aspects of the application. The information about the words may include their spelling (for textual interaction) and pronunciation (phonetic descriptions for speech interaction), and what language the word is in.

Senses are used to associate the exported words with the objects, attributes and functions that they represent.

The functionality of the application is provided (reflected) as an object model, with the objects representing the data which can be manipulated, methods of the objects being functionality which can be called, and attributes of the objects representing information variables, constants, and relationships between objects.

If the application requires special, unusual ways of expressing things, optionally grammars for this may be provided by the application.

Yet one option is possible organization of information in a speech recognition system, that the application may provide the models required by the speech recognition engine to recognize the words specified by the application. With this organization, the language-understanding engine is not required to have a speech recognition model for the entire language, only the built in words or their phonemes.

The language-understanding engine may contain functionality for speech recognition or text input using a speech model, parsing of a recognized string of words, and language-understanding using a grammar and a set of words. The speech model being used is a combination of a standard speech model (see below) residing in the language-understanding engine, and an optional application-specific speech model provided by the application. The grammar is a combination of a standard grammar (see below) residing in the language-understanding engine, and an optional application-specific grammar provided by the application. The set of words is a combination of a set of standard words (see below) residing in the language-understanding engine, and an application-specific set of words provided by the application. Given this, the speech recognition, parsing and language-understanding is done in the context of the objects and senses exported by the application, to resolve the actual semantic meaning of an utterance, and thereafter execute the resolved action (method) with appropriate parameters by calling the application back through the invention API. The data contained in the language-understanding engine is language-specific, and multiple languages may be supported simultaneously. The language-understanding engine has the following information:

- Standard Grammars: The standard grammar for utterances and phrases in various languages, which are independent of the domain may be built into the language-understanding engine.
- Standard Words; The so-called "closed" word classes (such as pronouns, prepositions, conjunctions, articles etc) and some very common words in each known language may be built into the language-understanding engine.
- Standard Speech Models: If the language-understanding unit also does speech recognition, it may contain speech recognition models (such as Hidden Markov Model statistical speech models) for the languages that it knows.

Moreover, there is discussion below some consequences of the solution with respect to design consequences.

Figure 2:
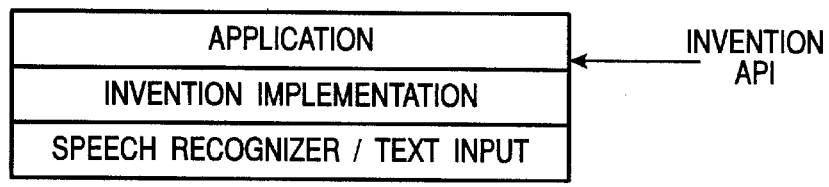
FIG. 2 schematically illustrating elimination of "custom code" according to the present invention.

One consequence is with respect to elimination of "custom code". Reference is here made to FIG. 2 of the attached drawings, where it is described that API according to the present invention allows applications to describe their functionality in a well-defined way, thus avoiding the problems arising from disparate custom solutions.

Another consequence of the invention design is that the "application-specific data must be transferred to the language-understanding unit" to enable it to correctly process utterances in the context of that application. This transfer can be considered as a two-step process:

1. The on-demand establishment of a connection or presence to determine the need of transfer of the application structure to the language-understanding engine.
2. Providing the application-specific linguistic data from the application to the language-understanding engine.

This can be done by direct transfer, or by providing access through a distributed object system.

A data model consists of objects with attributes. Relations between objects are expressed as attributes. The data model may also contain methods, which may be related to the objects. In some data models, all objects are divided up into classes, which are represented separately. The interpretations of a class is that objects are in some sense uniform instances of a class, often sharing the same attributes. This is a specialization of what is meant by a data model. There are often primitive objects, such as integers and text, which are not actually represented as objects, but treated as a special case. This is also a specialization of what is meant by a model. In some models the methods are not related to objects. Examples of data structures included in this definition of a data model are relational databases, object-oriented models, and structures in programming languages such as C.

Yet one consequence is that by the separation of application-specific data and the logic of the generic language-understanding engine, the mechanism is provided for both a "consistent natural language interaction model", and a "transparent (unified) natural language interaction" when multiple applications are accessible by the user. For instance, assuming that a user is in possession of a generic language-understanding unit, and gets access to more than one application using the present solution to present its functionality. Then, using the connection medium in place (a computer network, an ad-hoc wireless network, inter-process communication within one host, etc), each application exports its set of words, objects, methods, etc to the language-understanding unit. The language-understanding unit then fills in its standard (generic) grammar structures with these data models, and the user can interact with one single linguistic description that is capable of controlling each application directly. This shows that points 1 and 2 of the problem description are properly addressed by the solution according to the present invention. Furthermore, since the speech recognition and language-understanding logic resides in the generic language-understanding unit, this logic will not be needed in the application units, which also shows that point 3 of the problem description is properly addressed.

Yet another consequence is that techniques for building distributed object repositories exist (as exemplified above with respect to discussion of "distributed systems" according to background art), and it is possible to use similar methods to implement the communication between the application and the linguistic engine. Method calls for objects in a distributed situation could for instance be implemented by RPC-style (remote procedure call) mechanisms. The exact nature of the implementation will of course depend on the medium of transport that separates the application and the linguistic engine, which for instance may be separated on different hosts on Internet, different units on a wireless network or located on the same computer and simply separated by local inter-process communication or just native application calls.

FIG. 1 illustrates, with reference to the prior art, that a current Speech API:s requires a substantial amount of custom code to build an interactive linguistic interface to an application. The conventional speech recognizer with its API is so to speak glued with custom code to the application itself. The custom code provides the "intelligence" in translating a stream of words received from the speech recognizer to appropriate application calls. Any translation to actual application objects, methods, etc has to be done on a per-case basis in the custom code.

FIG. 2 shows The API according to the present invention allowing applications to describe their functionality in a well-defined way, thus avoiding the problems arising from disparate custom solutions. The present invention effectively eliminates large parts of the "custom code" required for conventional speech API:s (see description above with respect to background art). According to the present invention, the API is moving as seen by an application programmer "one level up", as evident when comparing FIG. 1 to FIG. 2.

Figure 3:
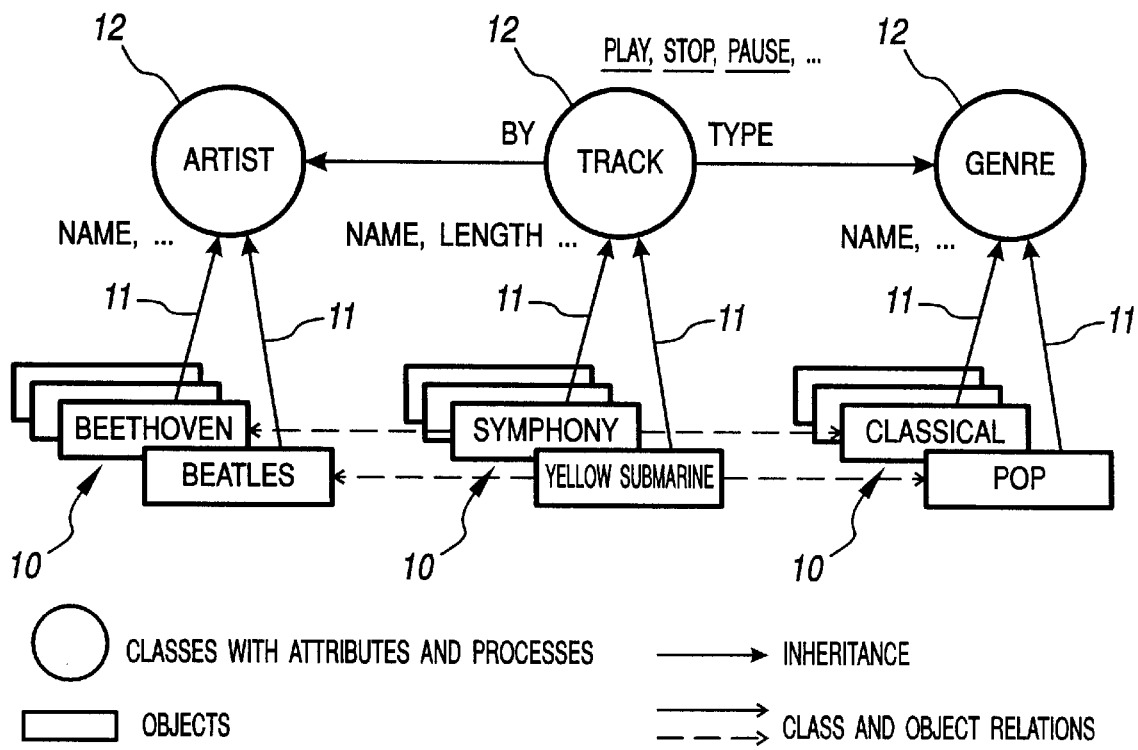
FIG. 3 schematically illustrates an implementing example according to the present invention.

As illustrated in FIG. 3, a practical use of the present invention is demonstrated. Described is the implementation of a music player controlled by speech and natural language, and controllable over a computer network, using the present invention as an implementation platform. The music player makes a set of words, senses, and objects representing the application functionality available to the natural language-understanding engine. Assume the following basic functionality:

Support for basic "music player" commands: play, stop and restart.

Support for songs, artists and genres.

To model this simple application, an object-oriented design, for example, through such software as Java or C++ etc., is created, as shown in FIG. 3. Given this, the application exports the following data, in accordance with the description above relating to the discussion of "distinction between application-specific and general linguistic logic";

"Words". The music player exports the following words, for example through a wireless interface to a language engine in accordance with the present invention, with associated textual and phonetic information:

Nouns for the available artists (such as "Beethoven", or "Beatles").

Nouns (or combined "pseudo-nouns") for the available songs titles (such as "Symphony" or "Yellow Submarine").

Nouns for general use in the context of a music player, such as "track", "song", and "music".

Adjectives for the available music genres (such as "classical" or "rock").

Verbs for the main functions to execute (such as "play", "stop" and "continue").

Depicted arrows in FIG. 3 illustrate inheritance (filled in arrow), classes (thinner arrow) and objects (dotted arrows).

"Senses". The application exports the senses 11 to connect each word to appropriate objects 10, attributes, and functions: each artist noun is connected to the appropriate object representing the artist. The noun "Beethoven" is connected to the object representing Beethoven, and so on. Similarly, each song title is connected to an object representing that song. Each general noun is connected to a corresponding object class. For instance, the nouns "track" and "music" can be connected to the song class. Each adjective is connected to an object representing the genre. The adjective "classical" is connected to the object representing classical music, and so on. Each verb is connected to an appropriate object process, to represent the action to be taken when the verb is uttered. For instance, the verb "play" is connected to a playback process of the object class representing songs.

"Objects". An object model with classes 12 and instances, for example, in an object oriented programming language, is built to reflect the music application data and functionality. Object classes 12 are created for songs, artists and genres. Processes for the desired functionality are assigned to these classes 12. For instance, a playback process is associated to the song class, and so on. Objects are instantiated for these classes 12, to represent the actual artists, songs, and genres in the system. A Beethoven instance of the artist class, a "Yellow Submarine" instance of the song class, a "classical music" instance of the genre class, and so on. Relevant attributes are set of the instance objects 10, to represent different properties of the underlying data. This can be to reflect the duration of a track, by a simple integer, or the genre of a song, which is represented by an object association, such as associating the "Symphony" object to the "classical music" object.

"Optional grammars and speech models". In this case, no special grammar rules need to be applied, the basic form of the allowed sentences residing in the language-understanding engine is sufficient. Similarly, no special speech models are required in this case, The phonetic descriptions of the words exported is sufficient to act as input to the standard speech model residing in the language-understanding engine.

The language-understanding engine contains an application-independent grammar description, along with a set of standard words (prepositions, etc), and generic speech models. The grammar description contains entries, such as; <verb> <noun>; or <verb> <preposition> <adjective> <noun>; or more intricate linguistic definitions. These general grammar descriptions, in the context of the data exported by the music application, result in a complete mapping between possible utterances and a mapping of these to appropriate actions to execute by making calls to the exported application interface.

As a runtime functionality example, assuming the following utterance from a user:
"Play a classical track". This is recognized by the standard speech recognizer, which produces a string of words. The string of words is fed into the language-understanding mechanism of the engine, and resolved in the context of the existing grammar, objects 10, classes 12, using the method described in the previous application incorporated above by reference filed by the same assignee, Voxi AB, as the present invention. Very briefly, this resolution manages to find a song object associated to the class representing "classical music". This also involves filtering out classes 12 that have a method associated to the word "play", and so on. Once this resolution is finished, the playback method is called on the resolved music application object. In this example, an outcome could be that the playback method of the object representing "Symphony" is called, resulting in a classical track being played to the user.

It is appreciated that means and logic mentioned throughout the above description could be realized through software, hardware, or by a combination of both as known in the art.

The present invention has been described with non-limiting examples and embodiments. It is the attached set of claims that describe all possible embodiments for a person skilled in the art.

What is claimed is:

1. A method of organizing linguistic data describing linguistic interaction with an application specific linguistic logic and a general linguistic understanding logic containing an application independent grammar description comprising the steps of:

separating said application logic from said general logic, said application logic containing functionality within a predetermined application domain wherein said functionality is provided through a data model;

reflecting said functionality to said general logic for use in linguistic interaction by providing that an application exports information about words and senses to said general logic; and providing a distributed consistent linguistic interaction model for different applications using the same general logic to interpret applications with different functionality.

2. The method according to claim 1 including the step of:

using senses to associate exported words with objects, attributes and classes that they represent.

3. The method according to claim 1 including the step of:

using information about words, including objects, attributes and classes from said data model.

4. The method according to claim 3 wherein:

said objects are nouns, said attributes are adjectives and said classes are verbs.

5. The method according to claim 1 including the step of:

using grammar as provided by an application for specific unusual expressions.

6. The method according to claim 1 wherein:

said general linguistic understanding logic belongs to speech-recognition.

7. The method according to claim 6 wherein:

an application provides the models required by a speech recognition logic to recognize words specified by said application.

8. The method according to claim 1 including the step of:

building into said general language understanding linguistic logic standard grammar for utterances and phrases in various languages, which are independent of domain.

9. The method according to claim 1 including the steps of:

establishing on-demand connection or presence to determine the need for transferring of the application structure to said general linguistic understanding logic; and providing said application specific linguistic data from said application to said general linguistic understanding logic.

10. The method according to claim 9 wherein:

the step of providing the application specific linguistic data from said application to the general linguistic understanding logic is accomplished by direct transfer or by providing access through a distributed object system.

11. The method according to claim 1 including the step of:

providing a wireless network as interface between said general logic and said application specific logic.

12. An apparatus for organizing linguistic data describing linguistic interaction with an application for specific linguistic logic and a general linguistic understanding logic engine means containing an application independent grammar description comprising:

means for separating said means for specific logic from said engine means, said specific logic means containing functionality within a predetermined application domain;

said functionality being provided with a data model;

means for reflecting said functionality to said logic engine means for use in linguistic interaction by providing that said specific logic means exports information about words and senses to said engine means; and means for providing a distributed consistent linguistic interaction for a different applications using the same general logic engine means to interpret applications with difference functionality.

13. An apparatus according to claim 12 wherein:

senses are used to associate exported words with objects, attributes and classes that they represent.

14. An apparatus as claimed in claim 12 wherein:

said information about words comprises objects, attributes and classes from said data model.

15. The apparatus according to claim 12 wherein:

said objects are nouns, said attributes are adjectives and said classes are verbs.

16. The apparatus according to claim 12 wherein:

grammars are provided by an application for a specific unusual expression.

17. The apparatus according to claim 12 wherein:

said general linguistic understanding logic belongs to speech recognition.

18. The apparatus according to claim 17 wherein:

an application provides the models required by the speech recognition logic to recognize words specified by said application.

19. The apparatus according to claim 12 wherein:

standard grammar for utterances and phrases in various language which are independent of a domain, are built into said general language understanding linguistic logic.

20. The apparatus according to claim 12 wherein:

a transfer of words occurs by on-demand establishment of a connection or presence to determine the need of transfer of the application structure to the general linguistic understanding logic and application specific linguistic data from the application is provided to said general linguistic understanding logic.

21. The apparatus according to claim 20 including:

a distributed object system for direct transfer or by providing access to moving application specific linguistic data from said application to said general linguistic understanding logic.

22. The apparatus according to claim 12 including:

a wireless network for interface between said general logic and said application specific logic.

* * * * *